(No Model.)
5 Sheets—Sheet 1.

G. E. BRUSH.
MACHINE FOR POUNCING BRIMS OF HATS.

No. 518,661. Patented Apr. 24, 1894.

WITNESSES:

INVENTOR
Geo. E. Brush
BY
ATTORNEY (No Model.)  5 Sheets—Sheet 2.

G. E. BRUSH.
MACHINE FOR POUNCING BRIMS OF HATS.

No. 518,661. Patented Apr. 24, 1894.

WITNESSES:
J. F. Finch.
A. J. Tanner.

INVENTOR
George E. Brush
BY
[signature]
ATTORNEY (No Model.)  5 Sheets—Sheet 3.

G. E. BRUSH.
MACHINE FOR POUNCING BRIMS OF HATS.

No. 518,661. Patented Apr. 24, 1894.

WITNESSES:

INVENTOR
Geo. E. Brush
BY
ATTORNEY (No Model.) 5 Sheets—Sheet 4.
G. E. BRUSH.
MACHINE FOR POUNCING BRIMS OF HATS.
No. 518,661. Patented Apr. 24, 1894.
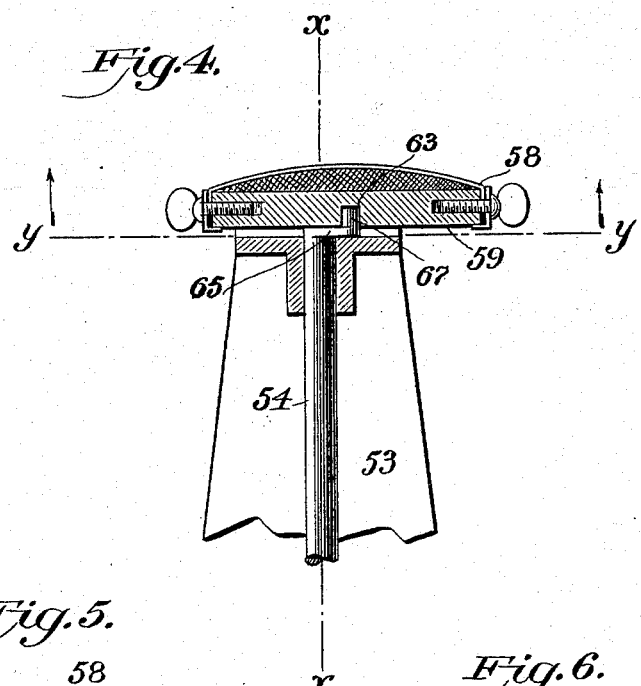
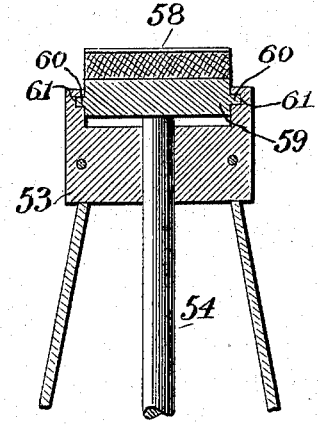
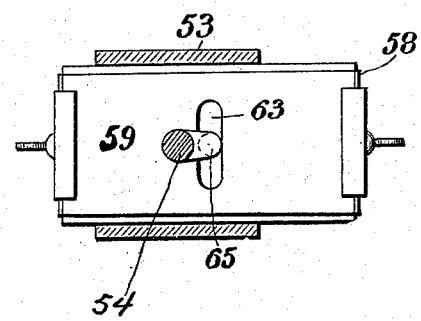
WITNESSES:
INVENTOR
Geo. E. Brush
BY
ATTORNEY (No Model.)   5 Sheets—Sheet 5.

G. E. BRUSH.
MACHINE FOR POUNCING BRIMS OF HATS.

No. 518,661.   Patented Apr. 24, 1894.

WITNESSES:
J. F. Finch.
A. J. Tanner.

INVENTOR
Geo. E. Brush.
BY
ATTORNEY

UNITED STATES PATENT OFFICE.

GEORGE E. BRUSH, OF DANBURY, CONNECTICUT.

MACHINE FOR POUNCING BRIMS OF HATS.

SPECIFICATION forming part of Letters Patent No. 518,661, dated April 24, 1894.

Application filed August 26, 1893. Serial No. 484,085. (No model.)

*To all whom it may concern:*

Be it known that I, GEORGE E. BRUSH, a citizen of the United States, residing at Danbury, in the county of Fairfield and State of Connecticut, have invented certain new and useful Improvements in Machines for Supporting and Pouncing the Brims of Hats; and I do hereby declare the following to be a full, clear, and exact description of the invention, such as will enable others skilled in the art to which it appertains to make and use the same.

My invention relates to machines for pouncing the brims of hats, but more particularly has reference to the provision of means whereby the brims may be supported and rotated positively and presented to the action of devices for pouncing such brims above and below at the same time.

In order that those skilled in the art to which my invention pertains, may fully understand the same, I will proceed to describe it in detail, reference being had to the accompanying drawings, in which—

Figure 1:
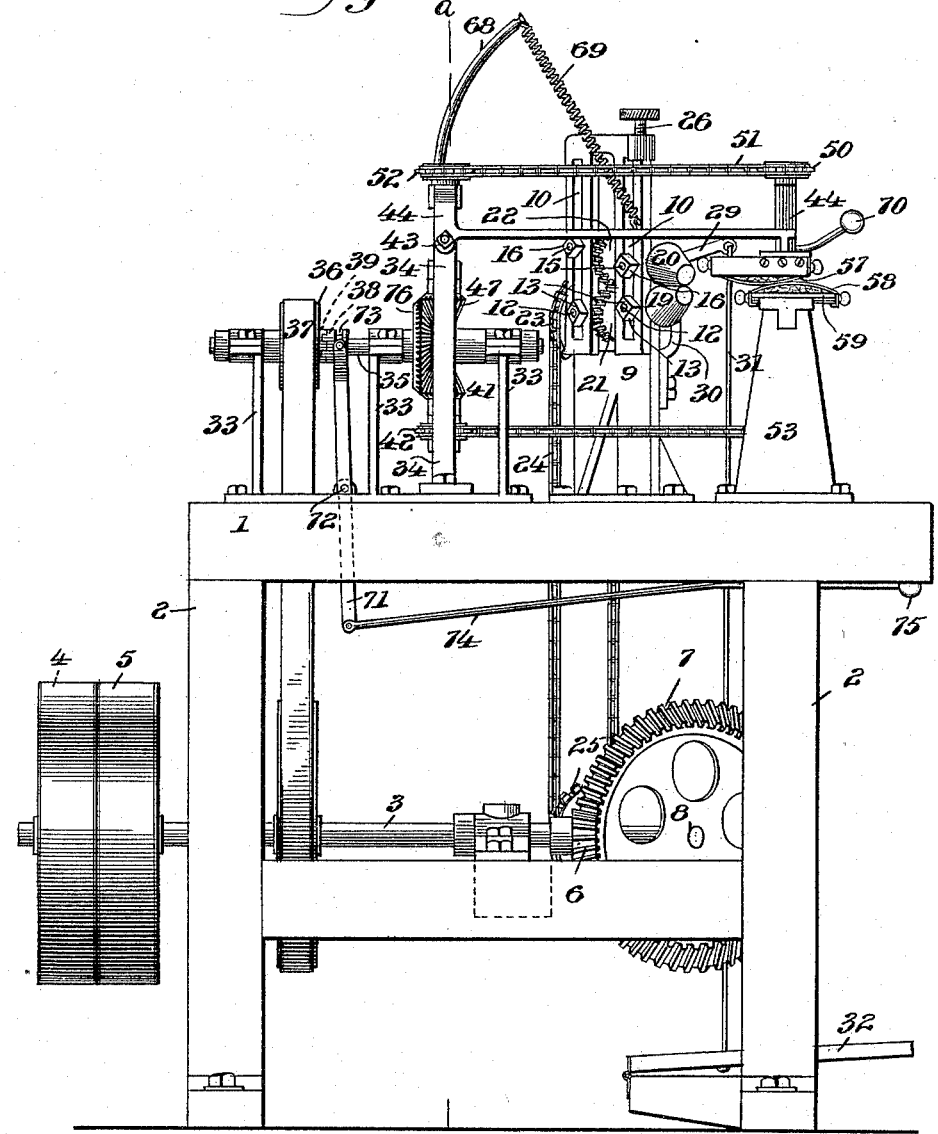
Figure 2:
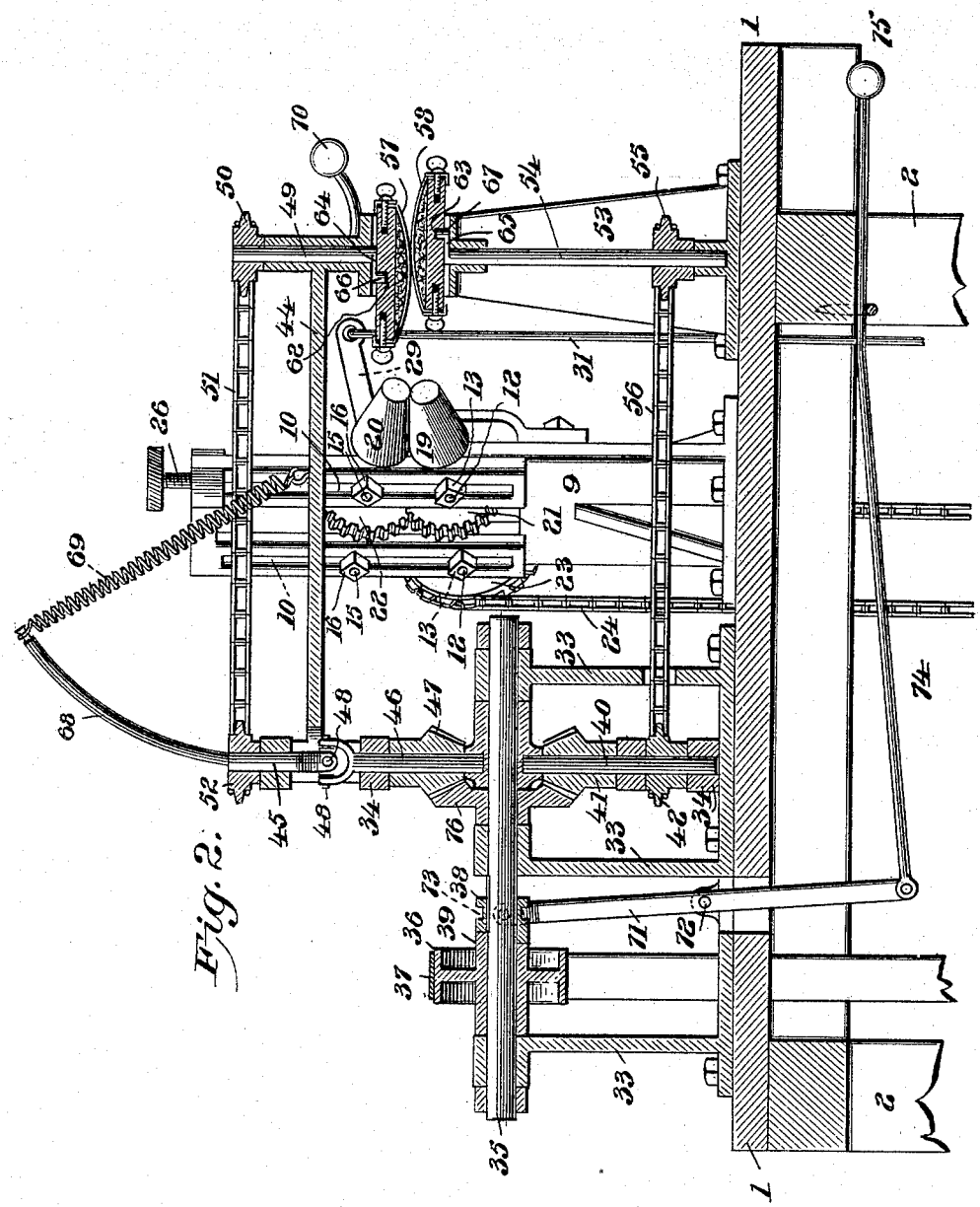
Figure 3:
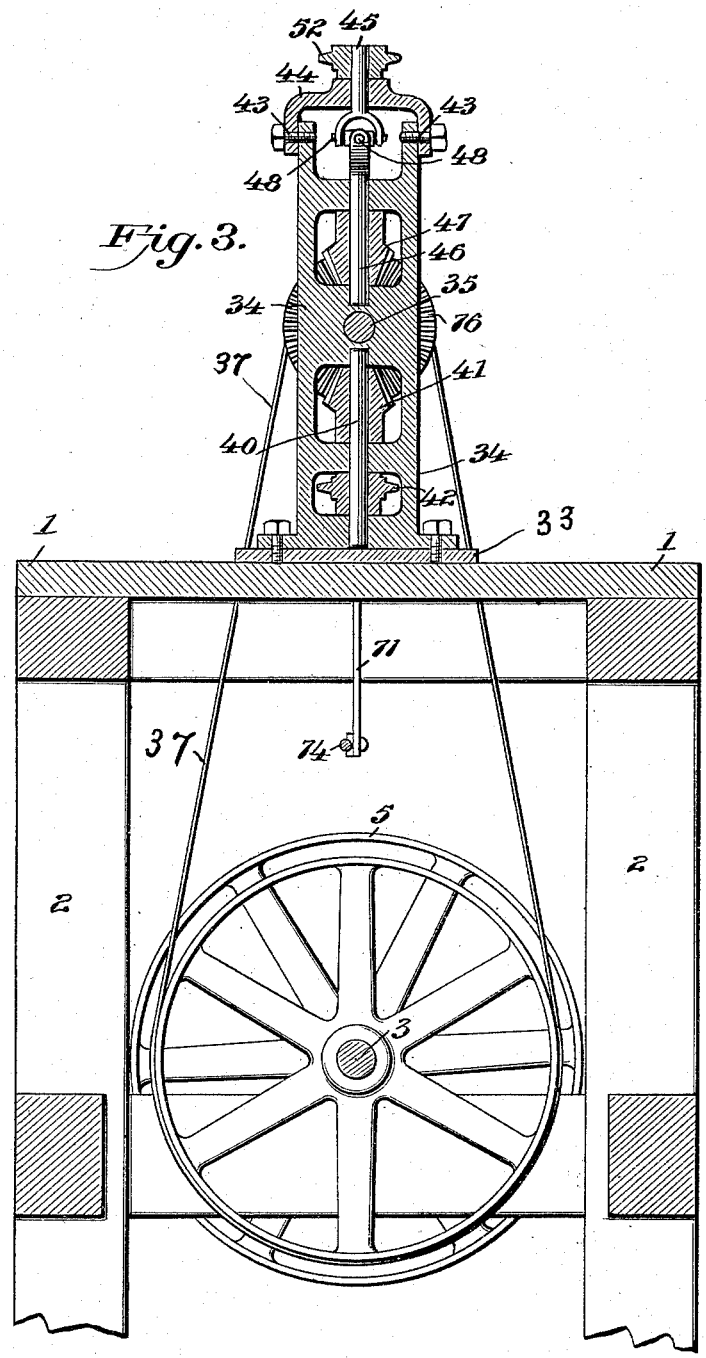
Figure 7:
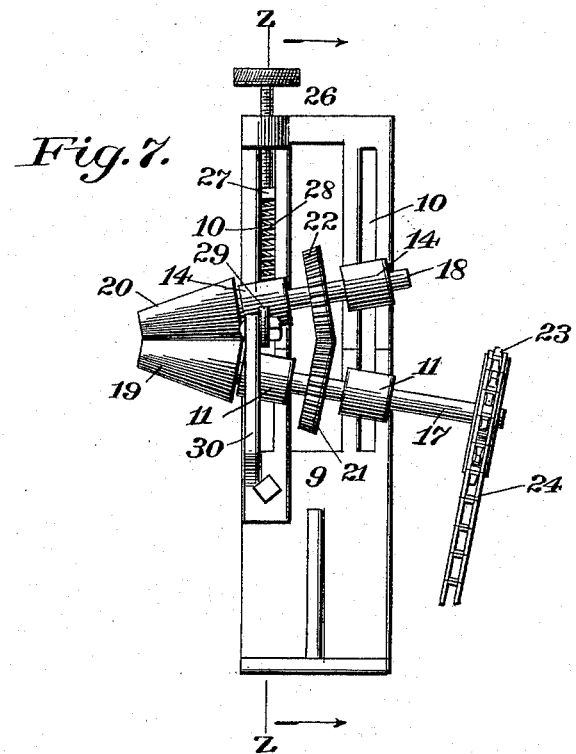
Figure 8:
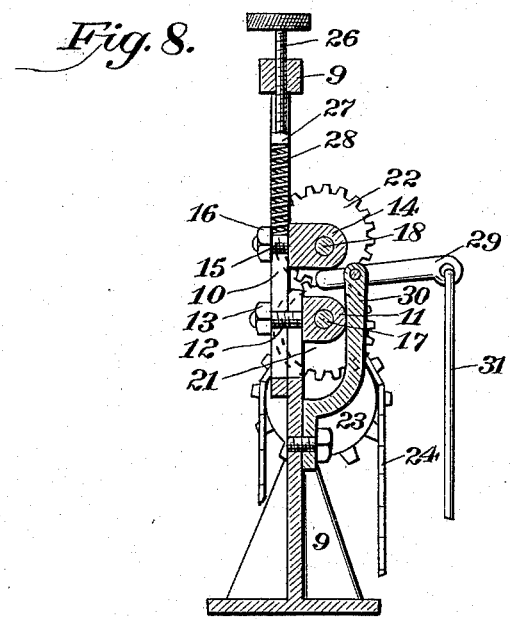

Figure 1 is a side elevation of my machine; Fig. 2 a cross section; Fig. 3 a section at the line *a—a* of Fig. 1; Fig. 4 a detail broken sectional view, on an enlarged scale of the lower hat supporting and pouncing pad; Fig. 5 a section at the line *x—x* of Fig. 4; Fig. 6 a section at the line *y—y* of Fig. 4; Fig. 7 a detail elevation of the feed rolls, and Fig. 8 a section at the line *z—z* of Fig. 7.

Similar numbers of reference denote like parts in the several figures of the drawings.

In machines of this description the brims are usually supported and revolved by feed rolls one above the other, which latter are of a cylindrical shape, but, as the outer portion of the brim revolves at a greater speed than the inner portion, there will be a dragging action between the rolls and the inner portion of the brim. Also, as it is necessary to revolve the brim so as to present the area thereof uniformly to the action of the pouncing devices, some means must be employed to continuously force the brim inwardly between the cylindrical rolls in order that the latter may always be in contact with a predetermined area of the brim. In my machine the brims are revolved by rolls without any dragging action whatever, and are carried between pouncing pads which operate in reverse directions.

1 is a bed or table supported by any suitable frame 2.

3 is the power-shaft journaled in any ordinary manner within the frame and having on its outer end the usual loose and tight pulleys 4, 5, while on the inner end of this shaft is a beveled pinion 6 which meshes with a beveled gear 7, which latter is mounted on a shaft 8 journaled in any suitable manner within the frame.

9 is a standard bolted to the bed and having throughout its upper portion elongated vertical openings 10.

11 are blocks having studs 12 extending through said openings, and 13 are nuts driven on said studs outside the wall of the standard whereby said blocks are firmly held in position. 14 are also blocks having studs 15 extending through said openings, and 16 are nuts which are driven on said studs outside the wall of said standard in such manner as to hold the blocks in position but at the same time permit of the vertical play of the latter.

17, 18, are short shafts journaled respectively within the blocks 11, 14, and 19, 20 are conical rolls carried by said shafts at their front ends. These rolls are exactly alike, and in normal position are in close contact with their apices pointing outwardly.

21, 22, are intermeshing spur gears carried respectively by the shafts 17, 18, and 23 is a sprocket wheel mounted on the shaft 17, and connected by a sprocket chain 24 to a sprocket wheel 25 mounted on the shaft 8, whereby rotary motion may be imparted to the conical rolls.

Within the top of the standard is an adjusting screw 26 the lower end of which is swiveled to a follower 27 guided within one of the openings 10, and 28 is a coil spring between said follower and the block 14 beneath it. It will thus be seen that, by virtue of this spring, the roll 20 is resiliently separable from the roll 19, and also that the normal spring pressure of this roll 20 against the roll 19 may be varied by manipulating the screw 26.

29 is a lever pivoted to an extension 30 bolted to the standard 9, the inner end of which lever is loosely connected to one of the blocks 14 while the outer end is connected by means of a rod 31 to a suitable treadle 32 hinged in any ordinary manner at the bottom of the frame 2. By depressing this treadle the roll 20 will be elevated against the resiliency of the spring 28, for the purpose of admitting a hat brim between the rolls as will be presently more fully explained.

The mechanism hereinbefore described refers particularly to the devices which I employ for the purpose of properly revolving the hat, and I will now describe the instrumentalities which support the hat and perform the pouncing of the brim on the upper and lower surfaces thereof.

33 is a bracket bolted to the bed and 34 is an upright bolted to said bracket. Within this bracket is journaled a shaft 35 which extends freely through the upright 34. Mounted on this shaft 35 is a loose pulley 36 which is connected by belt 37 to a pulley on the shaft 3, whereby motion is imparted from the latter to the shaft 35. Splined on the shaft 35 is a clutch collar 38 which is capable of engaging with the clutch hub 39 of the pulley 36. Journaled within the upright 34, below the shaft 35 is a vertical shaft 40 which carries a beveled pinion 41 at its upper end and a sprocket wheel 42 at its lower end. Pivoted to the upright 34 at its upper end as seen at 43 and in such manner as to be capable of a vertical swinging movement, is the top frame 44 within the rear end whereof is journaled a vertical short shaft 45.

46 is a vertical shaft journaled within the upright 34 above the shaft 35, and carrying a beveled gear 47. These shafts 45, 46, are connected together by the ordinary gimbal joint denoted by 48, so that said shafts will revolve in harmony even though the top frame be swung so that the axis of the shaft 45 will be at an angle to the axis of the shaft 46.

49 is a vertical shaft journaled within the forward end of the top frame and carrying at the upper end a sprocket wheel 50 connected by means of a chain 51 to a sprocket wheel 52 carried by the upper end of the shaft 45.

Journaled within an upright 53 bolted to the bed is a vertical shaft 54 carrying at its lower end a sprocket wheel 55 which is connected by a chain 56 to the sprocket wheel 42.

57, 58, are the upper and lower pouncing pads respectively, and they are made of any suitable shape and in any desired manner, best calculated to perform the desired functions. The back 59 of the pad 58 has tongues projecting from the side edges as seen at 60, which tongues extend within ways 61 in the top of the upright 53, so as to keep the pad in position and at the same time allow it to have a free sliding movement.

I have illustrated the above described arrangement only with relation to the lower pad, since the upper pad is arranged in precisely the same manner with respect to the bottom of the top frame, and it will therefore be readily understood that both of these pads are capable of a free to and fro sliding movement within guide ways which latter extend in the same direction. In backs of these pads are transverse elongated slots 62, 63, (the elongation being illustrated at Fig. 6 only in connection with the lower pad) and the shafts 49, 54, have at their inner ends cranks 64, 65, at the ends of which cranks are studs 66, 67, which project respectively within the slots 62, 63. It will thus be readily understood that when these shafts 49, 54, are revolved, the pads will be reciprocated back and forth. In order that these pads may move in reverse directions, the cranks 64, 65, are primarily assembled within the slots so as to extend in opposite directions as clearly shown at Fig. 2. The manner described of arranging these pads so that they may be capable of sliding is very ordinary and I do not wish to be limited thereby, since there are very many other ways of accomplishing this result all well known and within the range of ordinary mechanical skill. Also, since the imparting of movements to the pads by means of cranks on rotary shafts is merely one species of eccentric connection for the purpose of effecting reciprocatory movements in straight lines, my invention in this particular is not limited to the special construction employed and illustrated. Moreover, although I prefer to reciprocate the pads at the same speed in reverse directions, I am enabled, if desired, to impart a variable movement to one or both of the pads, by simply using eccentrics which have a different throw.

68 is an arm which extends upward from the upright 34 and 69 is a coil spring whose ends are secured respectively to said arm and to the top frame 44, the function of which spring is to act as a counterpoise to the weight of the frame to prevent the upper pad from bearing too heavily upon the hat brim. While I prefer to use this spring or some equivalent, it is not absolutely necessary but is merely an adjunctive device and the scope of my invention is not circumscribed thereby. I provide a suitable handle 70 which extends from the forward end of the top frame, whereby the latter may be raised to separate the pads and admit a hat brim between them.

71 is a lever pivoted at 72 to the bed and loosely connected, in the usual manner, within an annular groove 73 in the collar 38.

74 is a rod pivoted to the bottom of the lever 71 and provided at its outer end with any suitable handle 75 whereby said lever may readily be operated to throw the collar 38 into and out of engagement with the hub 39, for the purpose of actuating or stopping the movements of the operative parts of my machine.

Movements are given to the pouncing devices, through the medium of the beveled gear 76 carried by the shaft 35 which gear meshes with the beveled pinions 41, 47.

The operation of my machine is obviously as follows:—Power is communicated to the shaft 3 by means of belt (not shown) around the pulley 5, this belt being shifted to the pulley 4, in the usual manner, whenever it is desired to stop the revolution of the conical rolls. In placing a hat brim in position the treadle is depressed thereby elevating the top roll, the handle 70 lifted to separate the pouncing pads, and the brim then placed between the rolls and pads and the top roll and pad lowered so as to rest against the brim. It will be observed that these rolls embrace the brim at their smallest diameters nearest the crown of the hat, and it will be readily understood that the revolution of the brim will therefore be accomplished without any drag between the brims and rolls. This construction and relative arrangement of feed rolls is of course not new and I do not wish to be understood as laying any broad claim thereto, but they constitute a perfect means for feeding the hat brim in connection with upper and lower pouncing devices operating simultaneously in reverse directions. The hat is supported by the lower pouncing pad, the function of the rolls being merely to draw the brim along through the pads, and since this support has the reciprocatory motion hereinbefore set forth, it will be readily understood that the brims are not dragged across a stationary support and furthermore, it will be evident that, since the brim is revolved at a uniform rate of speed without any drag or slipping, the pouncing devices, operating as they do at the same speed in reverse directions, will neither interrupt the continuous delivery of the brim nor tend to thrust the latter in either direction beneath the rolls.

Having thus described my invention, what I claim as new, and desire to secure by Letters Patent, is—

1. In a machine for pouncing hat brims, the combination of suitable means for revolving the brims, the upper and lower pouncing pads, on which latter the brims are supported, separate and independent shafts eccentrically connected to said pads, the primary shaft which is connected to the power shaft, and operative connections between the latter shaft and the shafts to which the pads are secured, whereby simultaneous movements may be imparted to said shafts, substantially as set forth.

2. In a machine for pouncing hat brims, the combination of the two vertical shafts journaled respectively in the stationary frame of the machine and in a frame capable of a vertical swinging movement, the pouncing pads eccentrically secured to the ends of said shafts, the shaft to which the power is communicated to drive the machine, and independent operative connections between the latter shaft and the first mentioned shafts, substantially as set forth.

3. The combination of the shafts 49, 54, the guided reciprocatory pads, eccentric connections between said shafts and pads whereby the latter may be actuated in reverse directions, means for revolving said shafts independent of each other, and devices for revolving the hat brims during the operation of said pads, substantially as set forth.

4. The combination of the rotatory shaft 35 carrying beveled gear 76, the rotatory shafts 40, 46, carrying beveled pinions 41, 47 meshing with said gear, the shaft 54 carrying sprocket 55, the sprocket 42 carried by shaft 40, the chain 56 connecting said sprockets, the top frame 44 capable of an independent swinging movement, the shaft 45 journaled in said frame and gimbal jointed to shaft 46, the shaft 49 journaled in said frame, sprockets 50, 52 carried by shafts 49, 45, chain 51 connecting said sprockets, the upper and lower pouncing pads capable of being reciprocated within ways, and eccentric connections between the shafts 49, 54 and said pads whereby the latter are actuated, substantially as set forth.

In testimony whereof I affix my signature in presence of two witnesses.

GEORGE E. BRUSH.

Witnesses:
 JABEZ AMSBURY,
 ALEX. I. GORDON.